United States Patent
Prabhu et al.

(10) Patent No.: US 12,475,668 B2
(45) Date of Patent: Nov. 18, 2025

(54) TAG BASED FLASH INTENSITY DETERMINATION FOR IMAGE CAPTURE

(71) Applicant: Motorola Mobility LLC, Chicago, IL (US)

(72) Inventors: Ashok Oliver Prabhu, Bangalore (IN); Jeevitha Jayanth, Bangalore (IN); Sindhu Chamathakundil, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 177 days.

(21) Appl. No.: 17/988,539

(22) Filed: Nov. 16, 2022

(65) Prior Publication Data
US 2024/0161439 A1  May 16, 2024

(51) Int. Cl.
*G06V 10/141* (2022.01)
*G03B 15/03* (2021.01)
(Continued)

(52) U.S. Cl.
CPC ........... *G06V 10/141* (2022.01); *G03B 15/03* (2013.01); *G06T 7/70* (2017.01); *G06V 10/25* (2022.01);
(Continued)

(58) Field of Classification Search
CPC .... G06V 10/141; G06V 10/25; G06V 10/761; G06V 40/161; G06V 2201/07; G03B 15/03; G06T 7/70; G06T 7/73; H04N 23/73; H04N 23/88; H04N 23/611; H04N 23/675; H04N 23/72
See application file for complete search history.

(56) References Cited

U.S. PATENT DOCUMENTS

| | | |
|---|---|---|
| 6,801,716 B2 | 10/2004 | Takeuchi |
| 6,952,525 B2 | 10/2005 | Lee et al. |

(Continued)

FOREIGN PATENT DOCUMENTS

| | | |
|---|---|---|
| DE | 102018209732 A1 | 12/2019 |
| IN | 104834152 B | 2/2019 |
| KR | 20220080731 A | 6/2022 |

OTHER PUBLICATIONS

"Flash Exposure Control", Michigan Technological University [retrieved Sep. 20, 2022]. Retrieved from the Internet<https://pages.mtu.edu/~shene/DigiCam/User-Guide/FZ-10/Ext-Flash/Flash-Exposure.html#:~:text=To%20make%20flash%20exposure%20calculation,it%20reaches%20a%20preset%20level>., 3 Pages.

(Continued)

*Primary Examiner* — Abdelaaziz Tissire
(74) *Attorney, Agent, or Firm* — FIG. 1 Patents

(57) ABSTRACT

A computing device includes digital imaging functionality that captures images digitally using any of a variety of different technologies. The computing device receives an indication of, or determines, a distance between a physical location of a tag and an image capture module. The tag is a device that transmits and receives signals allowing one or more other devices to determine the physical location of the tag, such as an ultra-wideband tag. The computing device also includes a flash intensity determination system that automatically generates, based at least in part on the distance between the tag and the image capture module, a flash intensity for capturing a digital image.

20 Claims, 9 Drawing Sheets

(51) Int. Cl.
*G06T 7/70* (2017.01)
*G06V 10/25* (2022.01)
*G06V 10/74* (2022.01)
*G06V 40/16* (2022.01)

(52) U.S. Cl.
CPC .......... *G06V 10/761* (2022.01); *G06V 40/161* (2022.01); *G06V 2201/07* (2022.01)

(56) References Cited

U.S. PATENT DOCUMENTS

| | | | |
|---|---|---|---|
| 7,499,636 B2 | 3/2009 | Feng et al. | |
| 8,208,061 B2 | 6/2012 | Cheng | |
| 9,094,611 B2 | 7/2015 | Kennedy et al. | |
| 10,547,793 B2 | 1/2020 | Wang et al. | |
| 11,576,246 B2 * | 2/2023 | Petricek | H05B 47/115 |
| 12,120,431 B2 | 10/2024 | Jayanth et al. | |
| 2006/0238370 A1 * | 10/2006 | Park | G01S 5/12 340/539.2 |
| 2007/0230933 A1 | 10/2007 | Sugimoto et al. | |
| 2008/0075445 A1 | 3/2008 | Whillock et al. | |
| 2008/0129825 A1 * | 6/2008 | DeAngelis | H04N 23/661 348/E7.086 |
| 2010/0045854 A1 * | 2/2010 | Cheng | G03B 15/05 348/E5.022 |
| 2015/0138427 A1 * | 5/2015 | Kennedy | H04N 23/631 348/345 |
| 2015/0168219 A1 * | 6/2015 | Itoh | H04N 23/61 250/338.3 |
| 2016/0050518 A1 | 2/2016 | Seo et al. | |
| 2016/0124288 A1 | 5/2016 | Yang et al. | |
| 2016/0182801 A1 | 6/2016 | Luk et al. | |
| 2016/0277648 A1 * | 9/2016 | Yamaguchi | H04N 23/56 |
| 2017/0123041 A1 * | 5/2017 | Bae | H04N 5/144 |
| 2017/0289421 A1 * | 10/2017 | Tan | H04N 23/74 |
| 2019/0020803 A1 * | 1/2019 | Chen | G01S 11/12 |
| 2019/0215436 A1 | 7/2019 | Lee | |
| 2019/0342491 A1 * | 11/2019 | Mandavilli | G06V 40/1365 |
| 2021/0190483 A1 * | 6/2021 | Ilg | G06T 7/70 |
| 2021/0304577 A1 | 9/2021 | Hollar et al. | |
| 2022/0058826 A1 * | 2/2022 | Hasegawa | G01B 11/00 |
| 2022/0076018 A1 | 3/2022 | Geiss et al. | |
| 2022/0303468 A1 * | 9/2022 | Murakami | H04N 23/682 |
| 2023/0171493 A1 | 6/2023 | Omelchenko et al. | |
| 2023/0232106 A1 | 7/2023 | Hwang et al. | |
| 2024/0121515 A1 * | 4/2024 | Jayanth | H04N 23/675 |

OTHER PUBLICATIONS

Vorenkamp, Todd , "How Focus Works", B&H eXplora [retrieved Sep. 20, 2022]. Retrieved from the internet <https://www.bhphotovideo.com/explora/photography/tips-and-solutions/how-focus-works#:~:text=A%20computer%20inside%20the%20camera,vertical%20details%20in%20the%20image.>., Mar. 19, 2015, 24 Pages.

U.S. Appl. No. 17/957,619, filed Jan. 24, 2024 , "Non-Final Office Action", U.S. Appl. No. 17/957,619, filed Jan. 24, 2024, 12 pages.

U.S. Appl. No. 17/957,619, filed Sep. 5, 2024 , "Notice of Allowance", U.S. Appl. No. 17/957,619, filed Sep. 5, 2024, 3 pages.

U.S. Appl. No. 17/957,619, filed Sep. 18, 2024 , "Supplemental Notice of Allowability", U.S. Appl. No. 17/957,619, filed Sep. 18, 2024, 3 pages.

U.S. Appl. No. 17/957,619, filed Jun. 12, 2024 , "Notice of Allowance", U.S. Appl. No. 17/957,619, filed Jun. 12, 2024, 10 pages.

* cited by examiner

US 12,475,668 B2

TAG BASED FLASH INTENSITY DETERMINATION FOR IMAGE CAPTURE

BACKGROUND

As technology has advanced our uses for computing devices have expanded. One such use is digital photography. Many computing devices, such as mobile phones, include imaging devices allowing users to capture digital images. While many users enjoy the ability to capture digital images with their computing devices, current imaging devices are not without their problems. One such problem is that computing devices typically use estimation algorithms that automatically determine the flash intensity based on auto-focus information or ambient light. These estimation algorithms, however, do not always account for a region that the user is interested in, which can be frustrating for users due to the region the users are interested in not being illuminated properly.

BRIEF DESCRIPTION OF THE DRAWINGS

Embodiments of tag based flash intensity determination for image capture are described with reference to the following drawings. The same numbers are used throughout the drawings to reference like features and components.

DETAILED DESCRIPTION tag based flash intensity determination for image capture is discussed herein. Generally, a computing device includes digital imaging functionality that captures images digitally using any of a variety of different technologies. The computing device receives an indication of, or determines, a distance between a physical location of a tag and an image capture module. This distance may also be referred to as the distance between the physical location of the tag and the computing device (e.g., which includes the image capture module). The tag is a device that transmits and receives signals allowing one or more other devices to determine the physical location of the tag, such as an ultra-wideband (UWB) tag. The computing device also includes a flash intensity determination system that automatically generates, based at least in part on the distance between the tag and the image capture module, a flash intensity for capturing a digital image.

In contrast to traditional manners of determining flash intensity for capturing a digital image, the techniques discussed herein determine flash intensity for capturing a digital image based at least in part on the distance between a tag and the image capture module. This allows a region of interest associated with any desired item or area, as indicated by the presence of a tag located at that item or area, to be taken into account when determining flash intensity for capturing the digital image. The distance to the region of interest is automatically identified by the computing device without requiring any user input specifying the region of interest (e.g., without requiring the user to touch a region of interest on a viewfinder). Additionally, the distance to the region of interest can be determined easier and with less computation than other techniques (such as movement or motion tracking), which can reduce power usage in the computing device. Accordingly, a region of interest that the user is interested in (e.g., a particular person) that is not accounted for using traditional manners of determining flash intensity for capturing the digital, is accounted for in determining flash intensity for capturing the digital image using the techniques discussed herein.

Figure 1:
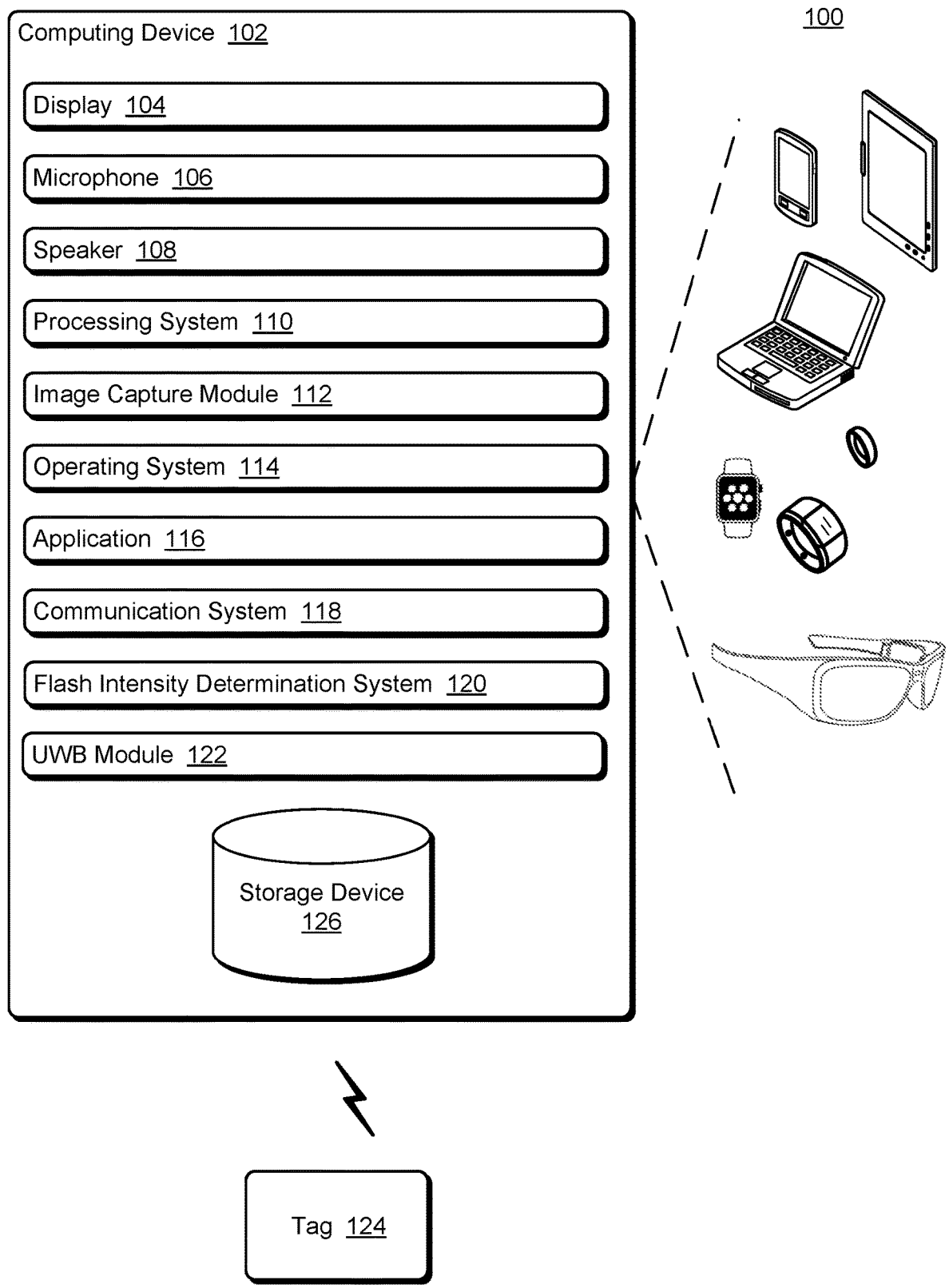
FIG. 1 illustrates an example system including a computing device implementing the techniques discussed herein.

FIG. 1 illustrates an example system 100 including a computing device 102 implementing the techniques discussed herein. The computing device 102 can be, or include, many different types of computing or electronic devices. For example, the computing device 102 can be a smartphone or other wireless phone, a notebook computer (e.g., netbook or ultrabook), a laptop computer, a camera (e.g., compact or single-lens reflex), a wearable device (e.g., a smartwatch, a ring or other jewelry, augmented reality headsets or glasses, virtual reality headsets or glasses), a tablet or phablet computer, a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, a fitness tracker, a smart TV, an automotive computer, a device that includes a UWB module, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processing system 110 that includes one or more processors, each of which can include one or more cores. The processing system 110 is coupled with, and may implement functionalities of, any other components or modules of the computing device 102 that are described herein. In one or more embodiments, the processing system 110 includes a single processor having a single core. Alternatively, the processing system 110 includes a single processor having multiple cores or multiple processors (each having one or more cores).

The computing device 102 also includes an image capture module 112, also referred to as an image capture device. The image capture module 112 captures images digitally using any of a variety of different technologies, such as a charge-coupled device (CCD) sensor, a complementary metal-oxide-semiconductor (CMOS) sensor, combinations thereof, and so forth. The image capture module 112 can include a single sensor and lens, or alternatively multiple sensors or multiple lenses. For example, the image capture module 112 may have at least one lens and sensor positioned to capture images from the front of the computing device 102 (e.g., the same surface as the display is positioned on), and at least one additional lens and sensor positioned to capture images from the back of the computing device 102.

The image capture module 112 can also include one or more flash devices each of which may be any of a variety of light emitting devices, such as a light-emitting diode (LED), a Xenon flash, and so forth. The image capture module 112 can also include a single flash device or multiple flash devices. For example, the image capture module 112 may have at least one flash device positioned to illuminate a scene from front of the computing device 102 (e.g., the same surface as the display is positioned on), and at least one additional flash device positioned to illuminate a scene from the back of the computing device 102.

In one or more implementations, the image capture module 112 senses and displays frames of video, also referred to as preview frames, at a particular rate (e.g., 60 images or frames per second). The preview frames provide the user an indication of the scene that the image capture module 112 will capture and store (e.g., in storage device 126 or cloud storage) if requested, such as by user input to the computing device 102 to capture an image (e.g., user selection of a button on the computing device 102). The techniques discussed herein determine flash intensity used by the image capture module 112 when capturing and storing images. In some situations, as discussed in more detail below, flash intensity is determined based on the preview frames even though the flash is not used until an image is captured for storage.

The computing device 102 also includes an operating system 114. The operating system 114 manages hardware, software, and firmware resources in the computing device 102. The operating system 114 manages one or more applications 116 running on the computing device 102 and operates as an interface between applications 116 and hardware components of the computing device 102.

The computing device 102 also includes a communication system 118. The communication system 118 manages communication with various other devices, including establishing voice calls with other devices, sending electronic communications to and receiving electronic communications from other devices, sending data to and receiving data from other devices, and so forth. The content of these electronic communications and the recipients of these electronic communications is managed by, for example, an application 116, the operating system 114, or a flash intensity determination system 120.

The computing device 102 also includes a UWB module 122 or chip which is responsible for communicating with a UWB tag, such as tag 124, attached to a subject. The tag 124 is an example of a UWB enabled device that the computing device 102 communicates with. The tag 124 is a device that allows its physical location to be identified or determined. The tag 124 can be any size, but oftentimes is small (e.g., the size of a quarter) to allow the tag 124 to be easily coupled to another device, person, other subject, and so forth. The tag 124 is attached to or located near an object to be tracked.

The physical location of the tag 124 is determined (e.g., by the UWB module 122, the communication system 118, a combination thereof, and so forth) in any of a variety of different manners. In one or more implementations, the tag 124 and the communication system 118 transmit and receive signals in accordance with UWB standards. The distance between the tag 124 and the computing device 102 as well as the location of the tag 124 relative to the computing device 102 is readily determined based on the time it takes signals to travel between the tag 124 and the computing device 102, and optionally between the tag 124 and other devices. The communication system 118 (or another module or system of the computing device 102, such as the UWB module 122) can use various techniques in accordance with the UWB standards to determine the distance between the tag 124 and the computing device 102, such as two-way ranging (TWR), time difference of arrival (TDoA), reverse TDoA, or phase difference of arrival (PDoA). An angle of arrival (AoA) of signals received from a device can also be readily determined in various manners, such as by determining a difference in the phase of the signal at different receiving devices (e.g., different antennas of the computing device 102) using PDoA. Using UWB allows the physical location of the tag 124 to be determined more accurately than other techniques, such as within 5 to 10 centimeters.

Additionally or alternatively, the tag 124, communication system 118, and UWB module 122 use other technologies to transmit and receive signals that identify the distance between the tag 124 and the computing device 102, that identify the location of the tag 124, or that allow the distance between the tag 124 and the computing device 102 as well as the location of the tag 124 to be determined. For example, the tag 124 and communication system 118 may transmit and receive signals in accordance with other standards, such as Bluetooth™ standards, WiFi™ standards, and so forth. Various techniques may be used to determine the physical location of the tag 124 (which inherently includes the distance between the tag 124 and the computing device 102), such as triangulation based on signals received from various devices (e.g., the computing device 102 and other devices), based on signals received from different antennas of the computing device 102, and so forth.

In one or more implementations, the tag 124 also transmits various characteristics of the tag 124, such as an identifier of the tag 124 (e.g., a media access control (MAC) address), information stored in the tag 124 by an owner or user of the tag 124, and so forth. Additionally or alternatively, characteristics of the tag 124, such as information provided by an owner or user of the tag 124, may be maintained by the computing device 102 (e.g., in a storage device 126) or in a cloud service. In one or more implementations, the computing device 102 communicates with any tag 124 within communication range of the computing device 102 to determine the physical location of the tag.

Additionally or alternatively, the computing device 102 is associated with particular tags (e.g., the identifier of the tag 124 is recorded by the computing device 102 or by a cloud service during a tag registration process), and the computing device communicates with tags that are associated with the computing device 102 to determine the physical locations of such tags. Accordingly, in such situations the communication system 118 provides an indication of the physical location of a tag 124 to the flash intensity determination system 120 only if the computing device 102 is associated with the tag 124.

The flash intensity determination system 120 receives an indication of the distance between the tag 124 and the computing device 102. This indication may be generated by the communication system 118, by the UWB module 122, or by another module or system of the computing device 102 as discussed above. The flash intensity determination system 120 uses the distance between the tag 124 and the computing device 102 to compute a flash intensity for the image capture module 112 to use in capturing a digital image. This allows a region of interest associated with any desired item or area to be taken into account (e.g., prioritized) when determining the flash intensity for capturing the digital image. The region of interest is automatically identified by the computing device 102 without requiring any user input specifying the region of interest (e.g., without requiring the user to touch a region of interest on a viewfinder).

The flash intensity determination system 120 can be implemented in a variety of different manners. For example, the flash intensity determination system 120 can be implemented as multiple instructions stored on computer-readable storage media and that can be executed by the processing system 110. Additionally or alternatively, the flash intensity determination system 120 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

In one or more implementations, the tag based flash intensity determination for image capture may be enabled or disabled. When enabled, the distance between the tag 124 and the computing device 102 is used to determine the flash intensity for the image capture module 112. However, when disabled, the distance between the tag 124 and the computing device 102 is not used to determine the flash intensity for the image capture module 112. The tag based flash intensity determination for image capture may be enabled or disabled in any of a variety of different manners, such as based on a user preference setting, based on a default setting, and so forth.

The computing device 102 also includes a storage device 126. The storage device 126 can be implemented using any of a variety of storage technologies, such as magnetic disk, optical disc, Flash or other solid state memory, and so forth. The storage device 126 can store various program instructions and data for any one or more of the operating system 114, application 116, and the flash intensity determination system 120.

Figure 2:
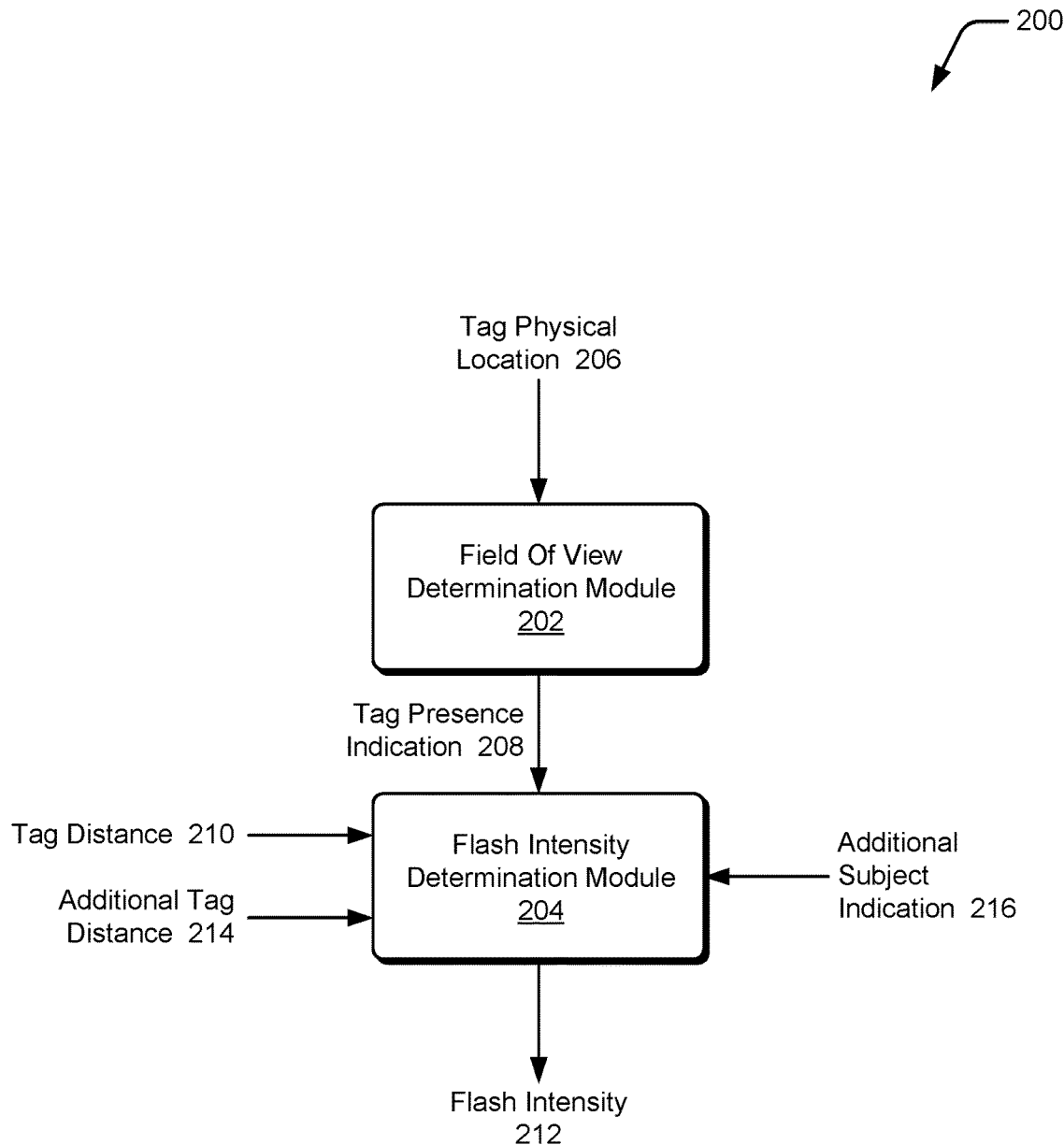
FIG. 2 illustrates an example system implementing the techniques discussed herein.

FIG. 2 illustrates an example system 200 implementing the techniques discussed herein. The system 200 implements, for example, a flash intensity determination system 120. The system 200 includes a field of view determination module 202 and a flash intensity determination module 204. The field of view determination module 202 receives a tag physical location 206, such as the physical location of a tag 124 of FIG. 1. The tag physical location 206 is received from, for example, the UWB module 122 or the communication system 118. The location information included in the tag physical location 206 is generated based on any of various different standards, such as UWB standards.

The field of view determination module 202 determines whether the tag is within the field of view of the image capture module 112. The field of view determination module 202 can readily determine whether the tag is within the field of view of the image capture module 112 given the tag physical location 206 as well as the orientation of the image capture module 112 (e.g., the direction the image capture module 112 is facing to captures images). The orientation of the image capture module 112 is obtained from any of a variety of sources, such as the operating system 114, any of various sensors in the computing device 102, and so forth.

The field of view determination module 202 provides a tag presence indication 208 to the flash intensity determination module 204 that indicates whether a tag is within the field of view of the image capture module 112. In one or more implementations the tag presence indication 208 also includes an identifier of each tag that is within the field of view of the image capture module 112. Knowing which tags are within the field of view of the image capture module 112 allows the flash intensity determination module 204 to determine the flash intensity based on tags that are in the scene that will be captured by the image capture module 112 and ignore tags that may be close to the image capture module 112 but that are not in the scene that will be captured by the image capture module 112.

The flash intensity determination module 204 also receives a tag distance 210. The tag distance 210 is a value that is the distance between the tag and the computing device 102, which may also be the distance between the tag and the image capture module 112 (or a sensor of the image capture module 112).

The flash intensity determination module 204 determines a flash intensity 212 based on the tag distance 210. The flash intensity 212 is communicated to the image capture module 112, which captures an image using the flash intensity 212. The image is captured in response to any of various events, such as user input requesting that an image be captured (e.g., user selection of an image capture button, audio input, and so forth). The flash intensity refers to the strength or brightness of the flash, and may be indicated in various manners. For example, the flash intensity may be a number (e.g., a range from 1 to 10), a power setting (e.g., full power, half power, one sixteenth power), and so forth.

The flash intensity determination module 204 determines the flash intensity 212 based on the tag distance 210 using any of a variety of different techniques. In one or more implementations, the flash intensity determination module 204 uses an algorithm or table that maps distances to flash intensity. For example, a distance of 0-3 feet may correspond to a flash intensity of one sixteenth power, a distance of 10-12 feet may correspond to a flash intensity of one half power, a distance of greater than 30 feet may correspond to a flash intensity of full power, and so forth.

In one or more implementations, the flash intensity determination module 204 determines the flash intensity 212 based on the tag distance 210 for a single tag. Additionally or alternatively, the flash intensity determination module 204 determines the flash intensity 212 based on one or more additional factors, such as ambient light level, distances to one or more additional tags, distances to one or more other regions of interest that are not associated with a tag (e.g., are identified using face recognition), and so forth.

When taking ambient light into account, the flash intensity determination module 204 determines the flash intensity 212 using any of a variety of techniques. For example, the image capture module 112 or other portion of the computing device 102 may include a light sensor that measures the ambient light level (e.g., in lux). The flash intensity determination module 204 determines an initial flash intensity, then adjusts the flash intensity based on the ambient light level. This adjustment is made in any of a variety of manners, such as applying various algorithms or tables to determine the adjustment. E.g., increase the flash intensity by three power levels (e.g., from five sixteenths power to one half power) if the ambient light level is less than 10 lux, increase the flash intensity by two power levels (e.g., from five sixteenths power to seven sixteenths power) if the ambient light level is between 10 and 100 lux, reduce the flash intensity to zero if the ambient light level is greater than 10,000 lux, and so forth.

When taking distance to multiple tags into account, the flash intensity determination module 204 receives one or more additional tag distances 214 and determines the flash intensity 212 using any of a variety of techniques. In one or more implementations, the flash intensity determination module 204 creates a combined distance by combining the distances of the multiple tags and uses an algorithm or table that maps distances to flash intensity as discussed above, but uses the combined distance rather than the distance to a single tag. The flash intensity determination module 204 combines multiple distances in any of a variety of different manners, such as averaging the distances, taking the median distance, and so forth.

Additionally or alternatively, the flash intensity determination module 204 identifies priorities for the multiple tags (e.g., a numerical range (e.g., 0-10) or other values such as low, medium, or high). These priorities are identified in any of a variety of different manners, such as the user having specified priorities for different tag identifiers, having different users associated with different tag identifiers and determining priorities based on contact lists (or favorites lists), and so forth. The flash intensity determination module 204 selects a tag having the highest priority (or selects, such as randomly or pseudo randomly, from multiple tags having the highest priority), and uses an algorithm or table that maps distances to flash intensity as discussed above, but uses the distance of the selected tag.

Additionally or alternatively, the flash intensity determination module 204 identifies a largest cluster of the multiple tags. The flash intensity determination module 204 applies any of a variety of public or proprietary clustering techniques to find a largest cluster of tags and determines a distance to that cluster. The distance to the cluster can be determined in different manners, such as by selecting one of the tags in the cluster (e.g., a tag that is closest to the image capture module 112 or a tag closest to a center of the cluster), combining (e.g., averaging) the distances between the tags in the cluster and the image capture module 112, and so forth. The flash intensity determination module 204 uses an algorithm or table that maps distances to flash intensity as discussed above, but uses the distance to the cluster.

When taking distances to one or more other regions of interest that are not associated with a tag into account, the flash intensity determination module 204 receives one or more additional subject indications 216 and determines the flash intensity 212 using any of a variety of techniques. These additional subjects can be people, animals, other objects, and so forth that are not associated with a tag. These one or more additional subject indications 216 may be detected by the flash intensity determination module 204 or another module of the computing device 102 (e.g., the operating system 114 or an application 116) using any of a variety of different techniques. Examples of such techniques include object detection techniques (e.g., to detect faces, animals, or other objects), object tracking techniques (e.g., to continue to detect objects in preview frames), movement detection techniques (e.g., to detect objects that are moving), and so forth.

For each additional subject indication 216, the flash intensity determination module 204 determines the distance from the subject to the image capture module 112 using any of a variety of public or proprietary techniques. The flash intensity determination module 204 combines these distances with the one or more distances between the one or more tags in any of a variety of manners as discussed above (e.g., averages the distances). The flash intensity determination module 204 uses an algorithm or table that maps distances to flash intensity as discussed above, but uses the combined distance.

Figure 3:
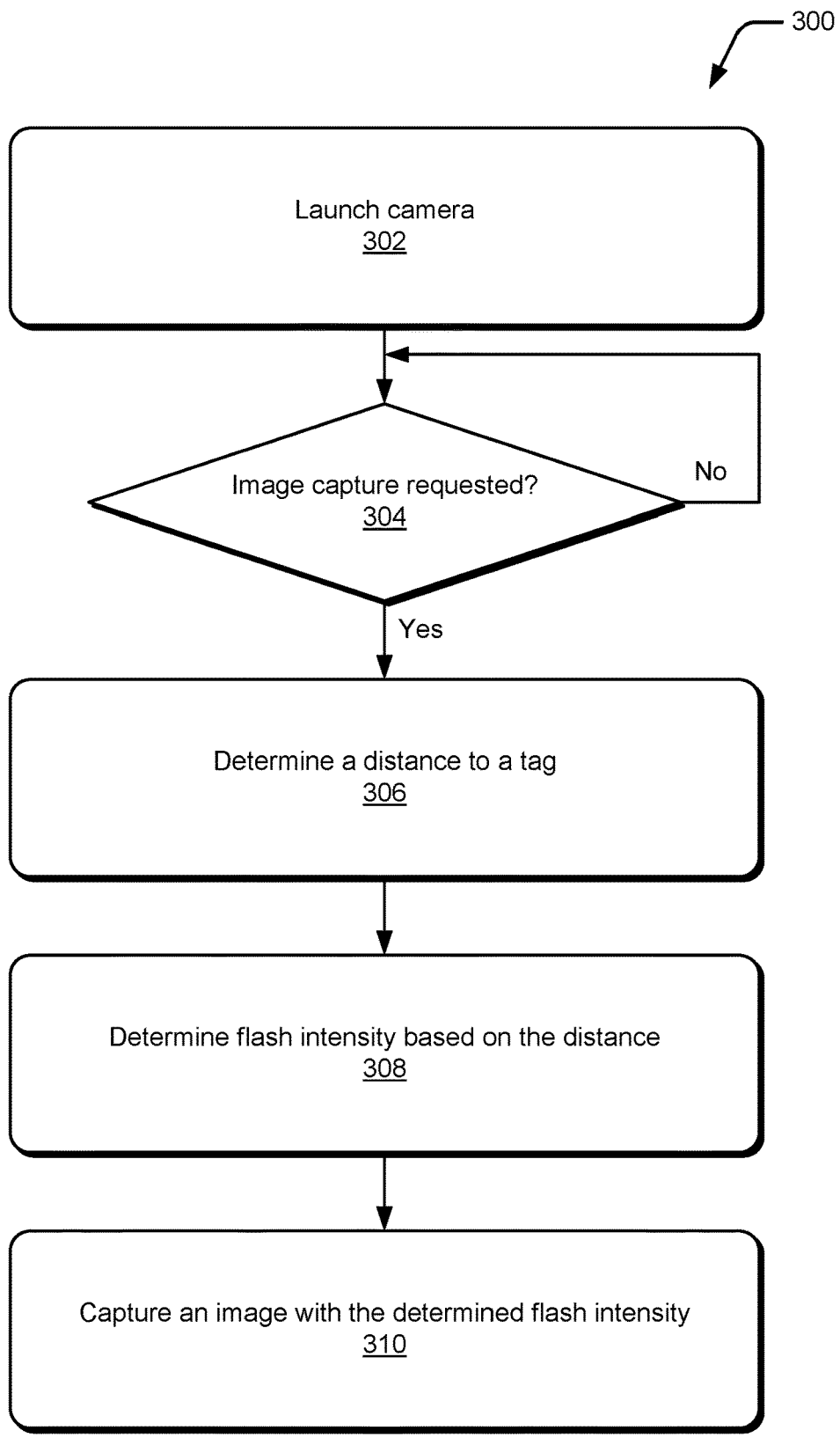
FIG. 3 illustrates an example process for implementing the techniques discussed herein in accordance with one or more embodiments.

FIG. 3 illustrates an example process 300 for implementing the techniques discussed herein in accordance with one or more embodiments. Process 300 is carried out by, for example, a communication system, a flash intensity determination system, and an image capture module, such as communication system 118, flash intensity determination system 120, and image capture module 112 of FIG. 1, and can be implemented in software, firmware, hardware, or combinations thereof. Process 300 is shown as a set of acts and is not limited to the order shown for performing the operations of the various acts.

In process 300, a camera is launched (act 302). Preview frames may be displayed to the user once the camera has launched.

Process 300 proceeds based on whether image capture is requested (act 304). Image capture can be requested in various manners, such as user selection of an image capture button, audible inputs, and so forth.

After image capture is requested, a distance to a tag is determined (act 306). This distance is, for example, a distance between the tag (e.g., a UWB device) and an image capture module. The tag is, for example, worn by a subject (e.g., a person, a pet, and so forth).

A flash intensity based on the distance to the tag is also determined (act 308). This flash intensity is automatically determined once the distance to the tag is determined.

An image is captured with the determined flash intensity (act 310).

Additionally or alternatively, acts 306 and 308 are performed prior to act 304, so the flash intensity is determined prior to image capture being requested.

Figure 4A:
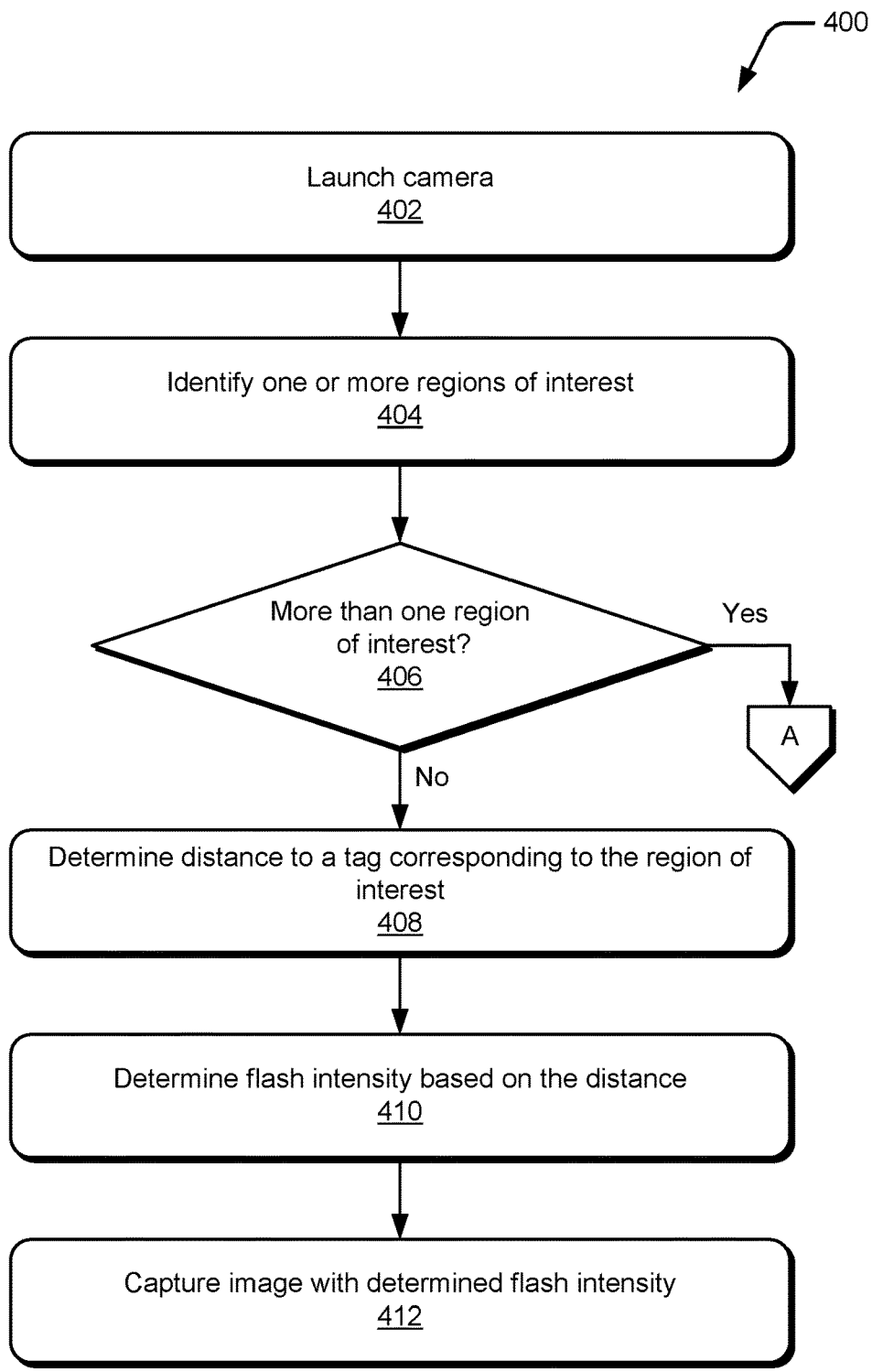
FIGS. 4A, 4B, and 4C illustrate another example process for implementing the techniques discussed herein in accordance with one or more embodiments.
Figure 4B:
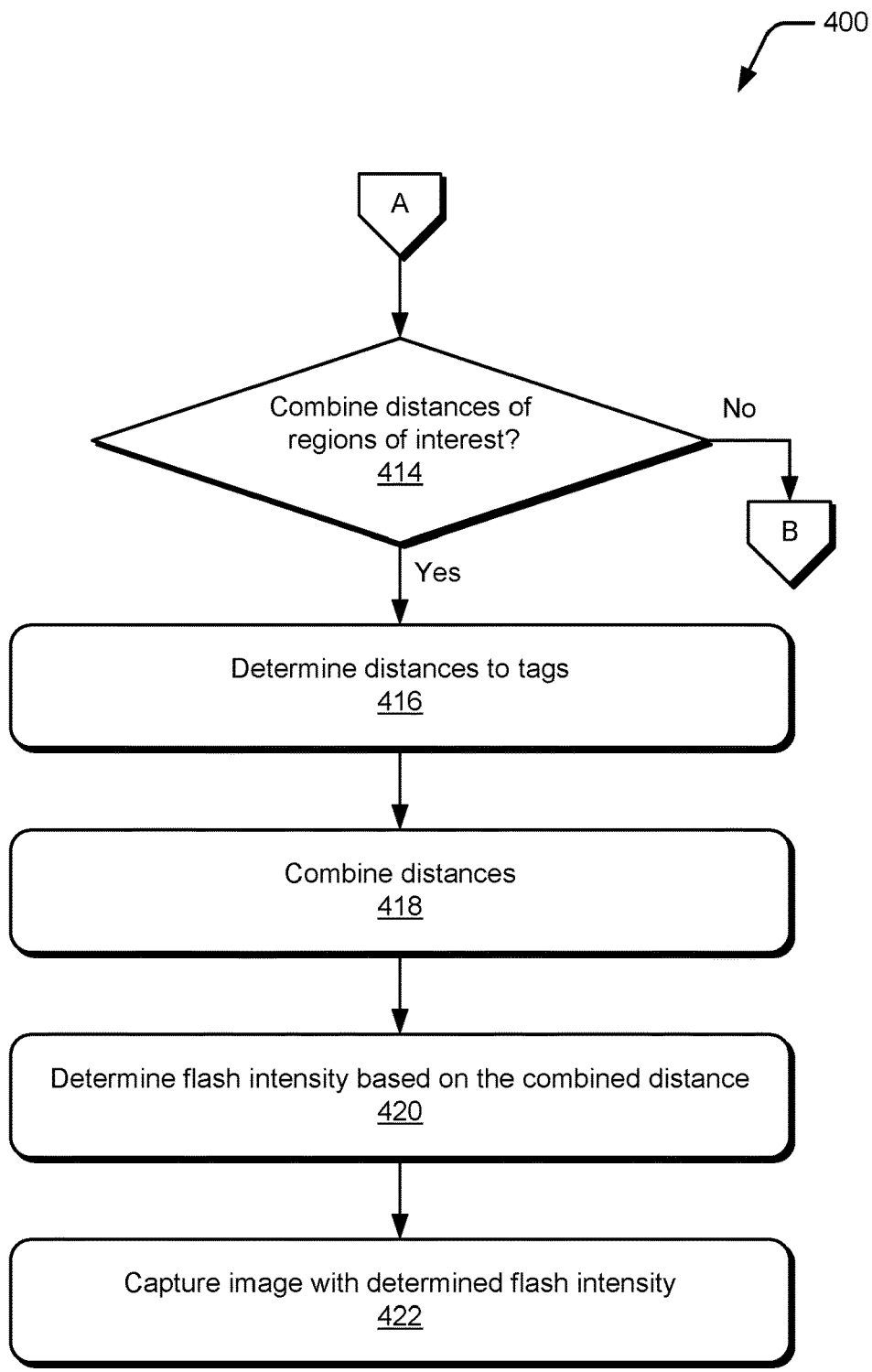
Figure 4C:
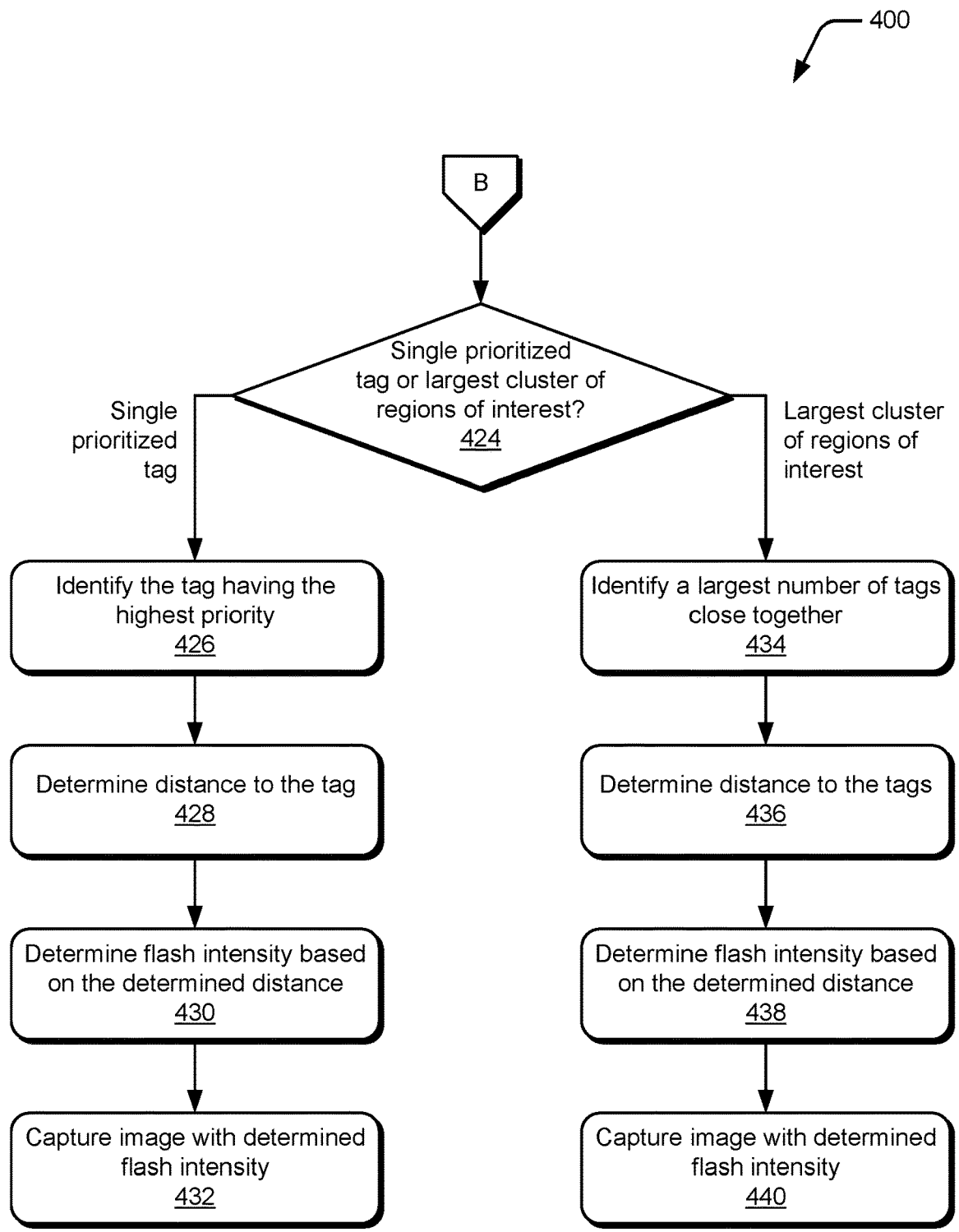

FIGS. 4A, 4B, and 4C illustrate an example process 400 for implementing the techniques discussed herein in accordance with one or more embodiments. Process 400 is carried out by, for example, a communication system, a flash intensity determination system, and an image capture module, such as communication system 118, flash intensity determination system 120, and image capture module 112 of FIG. 1, and can be implemented in software, firmware, hardware, or combinations thereof. Process 400 is shown as a set of acts and is not limited to the order shown for performing the operations of the various acts.

In process 400, a camera is launched (act 402). Preview frames may be displayed to the user once the camera has launched.

One or more regions of interest are identified (act 404). In one or more implementations, each region of interest is the physical location of a tag, such as a UWB device.

Process 400 proceeds based on whether there is more than one region of interest identified (act 406). If there is only one region of interest identified (e.g., a single tag is detected within the field of view of the image capture module), a distance to a tag is determined (act 408). This distance is, for example, a distance between the tag (e.g., a UWB device) and an image capture module.

A flash intensity based on the distance to the tag is also determined (act 410). This flash intensity is automatically determined once the distance to the tag is determined.

An image is captured with the determined flash intensity (act 412).

Returning to act 406, if there is more than one region of interest, process 400 proceeds to determine whether to combine (e.g., average) distances of regions of interest (act 414). Whether to combine distances of regions of interest is, for example, a user preference setting. If distances of regions of interest are to be combined, distances to each of the tags is determined (act 416). This distances are, for example, the distances between each tag (e.g., UWB devices) and an image capture module.

The distances are combined, (act 418). The distances can be combined in various manners, such as averaged.

A flash intensity based on the combined distance is determined (act 420). This flash intensity is automatically determined once the combined distance is determined.

An image is captured with the determined flash intensity (act 422).

Returning to act 414, if distances of regions of interest are not to be combined, process 400 proceeds to determine whether to use a single prioritized tag or a largest cluster of regions of interest (act 424). Whether to use a single prioritized tag or a largest cluster of regions of interest is, for example, a user preference setting.

If a single prioritized tag is to be used, a tag having the highest priority is identified (act 426). The priorities of tags can be determined in various manners, such as being set by a user, being automatically determined based on contacts or favorites lists, and so forth.

A distance to a tag is determined (act 428). This distance is, for example, a distance between the tag (e.g., a UWB device) and an image capture module.

A flash intensity based on the distance to the tag is also determined (act 430). This flash intensity is automatically determined once the distance to the tag is determined.

An image is captured with the determined flash intensity (act 432).

Returning to act 424, if a largest cluster of regions of interest is to be used, a largest number of tags close together is identified (act 434). This largest number of tags close together can be determined using any of a variety of public or proprietary clustering techniques.

A distance to the tags is determined (act 436). This distance is, for example, a distance between one tag (e.g., a UWB device) in the tags that are closest together (e.g., a tag closest to an image capture module or a tag closest to the center of the tags that are closest together) and the image capture module.

A flash intensity based on the determined distance to the tags is determined (act 438). This flash intensity is automatically determined once the distance to the tags is determined.

An image is captured with the determined flash intensity (act 440).

Figure 5A:
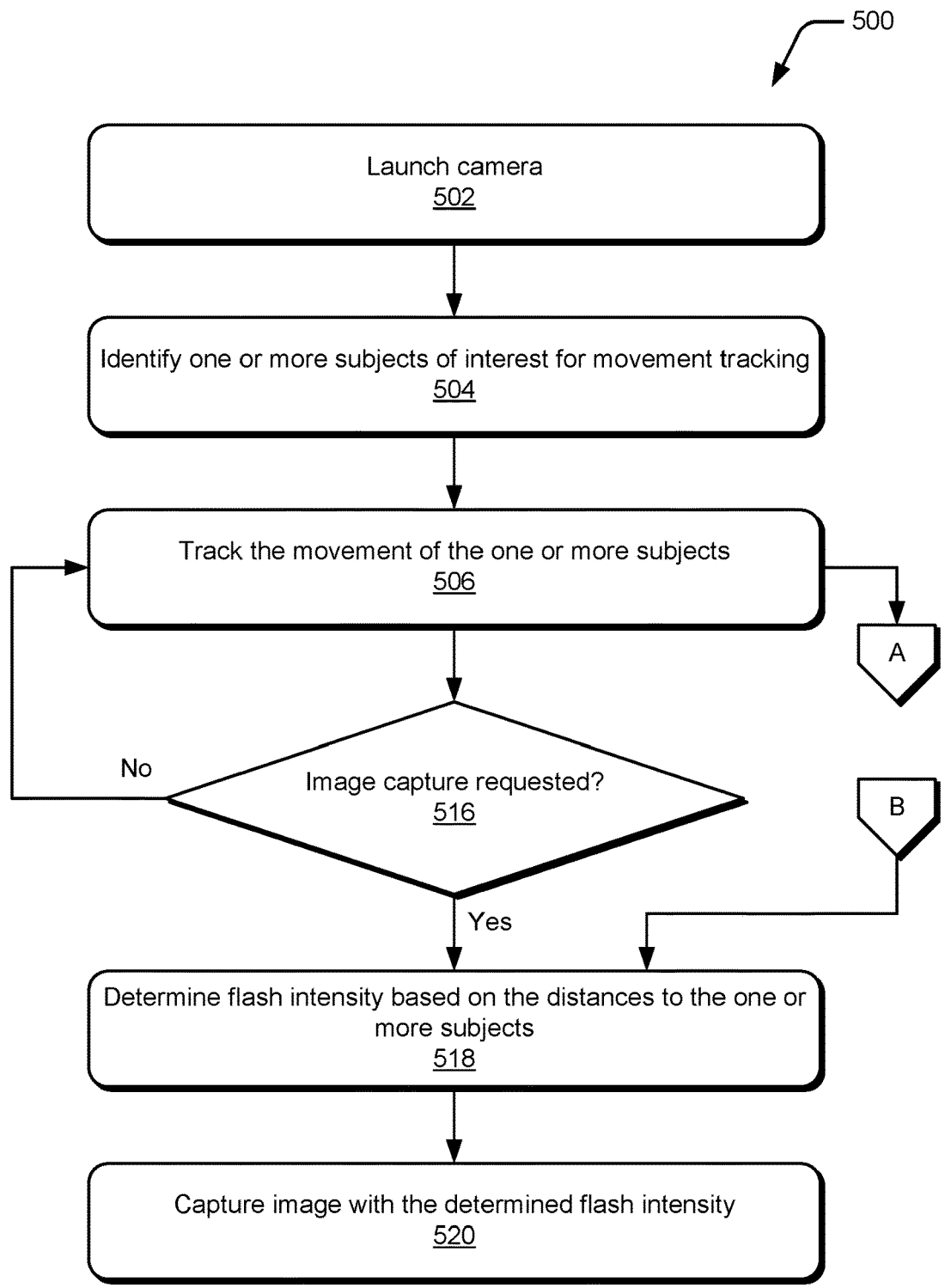
FIGS. 5A and 5B illustrate another example process for implementing the techniques discussed herein in accordance with one or more embodiments.
Figure 5B:
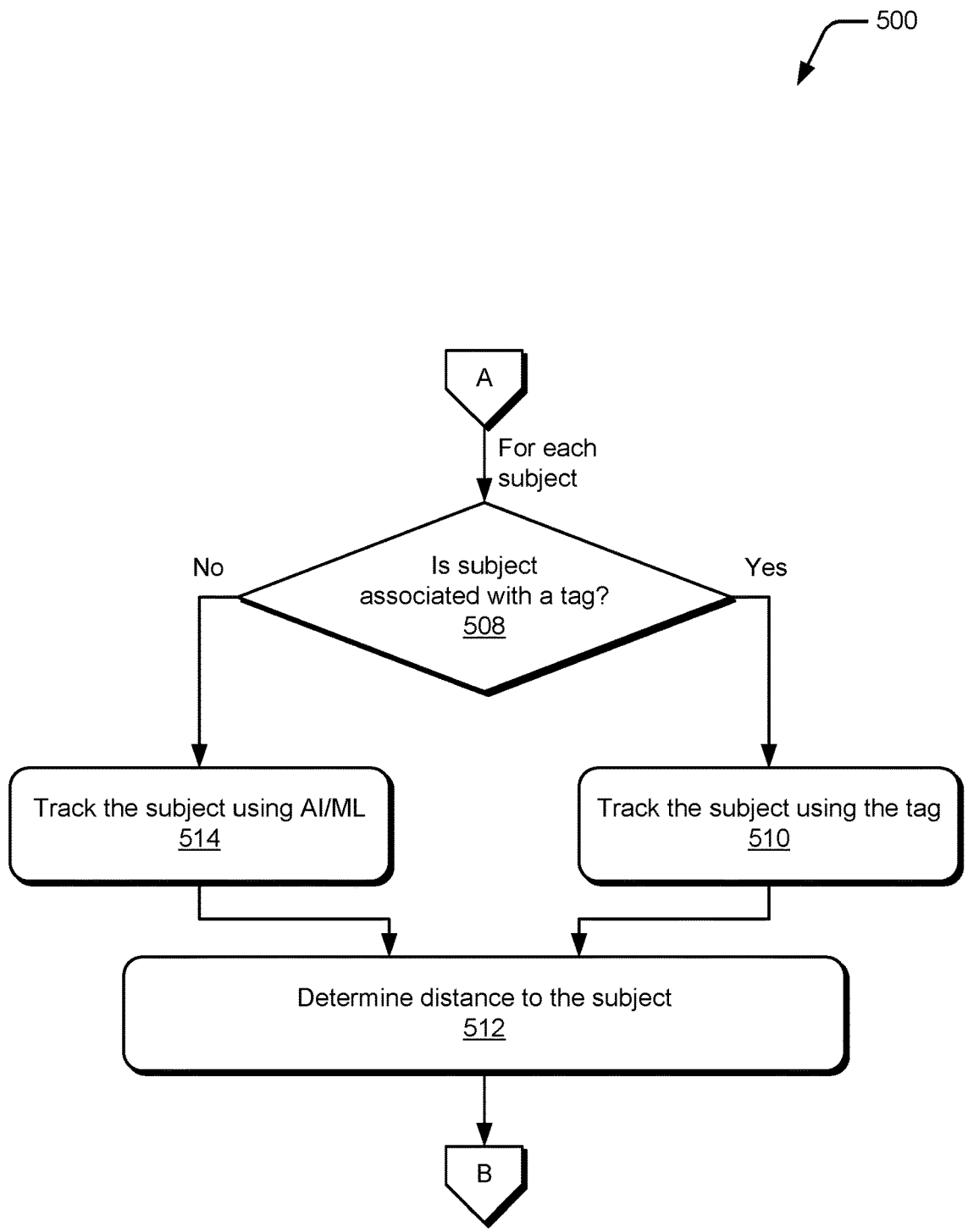

FIGS. 5A and 5B illustrate an example process 500 for implementing the techniques discussed herein in accordance with one or more embodiments. Process 500 is carried out by, for example, a communication system, a flash intensity determination system, and an image capture module, such as communication system 118, flash intensity determination system 120, and image capture module 112 of FIG. 1, and can be implemented in software, firmware, hardware, or combinations thereof. Process 500 is shown as a set of acts and is not limited to the order shown for performing the operations of the various acts.

In process 500, a camera is launched (act 502). Preview frames may be displayed to the user once the camera has launched.

One or more subjects of interest for movement tracking are identified (act 504). These one or more subjects may be people, animals, other objects, and so forth. The one or more subjects are identified in various manners, such as by identifying tags (e.g., UWB devices), using object (e.g., face) detection techniques, using other artificial intelligence (AI) or machine learning (ML) techniques, and so forth.

Movement of the one or more subjects is tracked (act 506). This movement is tracked using any of a variety of public or proprietary techniques, such as AI or ML techniques, detection of tags, and so forth.

To perform the tracking, for each of the one or more subjects, a check is made as to whether the subject is associated with a tag (act 508). A subject is associated with a tag if, for example, the tag is worn by the subject (e.g., a person or pet).

If the subject is associated with a tag then the subject is tracked using the tag (act 510) and a distance to the subject (e.g., the tag) is determined (act 512).

However, if the subject is not associated with a tag then the subject is tracked using AI or ML techniques (act 514) and a distance to the subject is determined (act 512). The distance to the subject is determined using any of a variety of techniques as discussed above.

Process 500 proceeds based on whether image capture is requested (act 516). Image capture can be requested in various manners, such as user selection of an image capture button, audible inputs, and so forth. If image capture is not requested, the movement of the one or more subjects continues to be tracked (act 506).

After image capture is requested, a flash intensity is determined based on the distances to the one or more subjects (act 518). The flash intensity can be determined in any of a variety of manners as discussed above (e.g., with reference to process 400), such as by using a single distance, using the distance to a tag having a highest priority, combining (e.g., averaging) the distances, and so forth.

An image is captured with the determined flash intensity (act 520).

Figure 6:
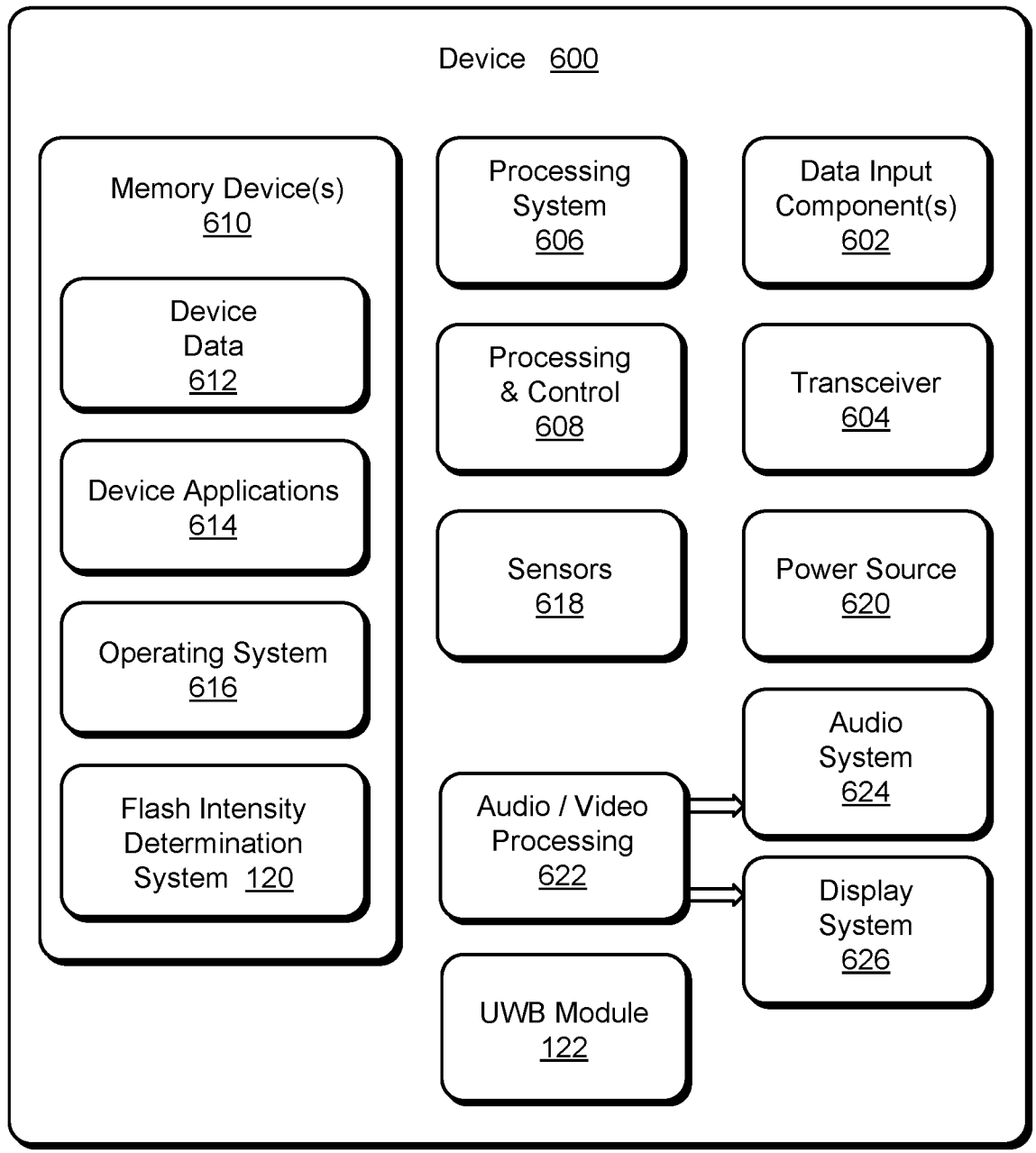
FIG. 6 illustrates various components of an example electronic device that can implement embodiments of the techniques discussed herein.

FIG. 6 illustrates various components of an example electronic device that can implement embodiments of the techniques discussed herein. The electronic device 600 can be implemented as any of the devices described with reference to the previous FIGS., such as any type of client device, mobile phone, tablet, computing, communication, entertainment, gaming, media playback, a device including a UWB module, or other type of electronic device. As illustrated, the electronic device 600 includes the flash intensity determination system 120 and UWB module 122, described above.

The electronic device 600 includes one or more data input components 602 via which any type of data, media content, or inputs can be received such as user-selectable inputs, messages, music, television content, recorded video content, and any other type of text, audio, video, or image data received from any content or data source. The data input components 602 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 602 may also include various other input components such as microphones, touch sensors, touchscreens, keyboards, and so forth.

The device 600 includes communication transceivers 604 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 600 includes a processing system 606 of one or more processors (e.g., any of microprocessors, controllers, and the like) or a processor and memory system implemented as a system-on-chip (SoC) that processes computer-executable instructions. The processing system 606 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 608. The device 600 may further include any type of a system bus or other data and command transfer system that couples the various components within the device. A system bus can include any one or combination of different bus structures and architectures, as well as control and data lines.

The device 600 also includes computer-readable storage memory devices 610 that enable data storage, such as data storage devices that can be accessed by a computing device, and that provide persistent storage of data and executable instructions thereon (e.g., software applications, programs, functions, and the like). These executable instructions cause, responsive to execution by the processing system 606, the device 600 to perform various acts. Examples of the computer-readable storage memory devices 610 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

The computer-readable storage memory device 610 provides data storage mechanisms to store the device data 612, other types of information or data, and various device applications 614 (e.g., software applications). For example, an operating system 616 can be maintained as software instructions with a memory device and executed by the processing system 606. The device applications 614 may also include a device manager, such as any form of a control application, software application, signal-processing and control module, code that is native to a particular device, a hardware abstraction layer for a particular device, and so on.

The device 600 can also include one or more device sensors 618, such as any one or more of an ambient light sensor, a proximity sensor, a touch sensor, an infrared (IR) sensor, accelerometer, gyroscope, thermal sensor, audio sensor (e.g., microphone), and the like. The device 600 can also include one or more power sources 620, such as when the device 600 is implemented as a mobile device. The power sources 620 may include a charging or power system, and can be implemented as a flexible strip battery, a rechargeable battery, a charged super-capacitor, or any other type of active or passive power source.

The device 600 additionally includes an audio or video processing system 622 that generates one or both of audio data for an audio system 624 and display data for a display system 626. In accordance with some embodiments, the audio/video processing system 622 is configured to receive call audio data from the transceiver 604 and communicate the call audio data to the audio system 624 for playback at the device 600. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for tag based flash intensity determination for image capture have been described in language specific to features or methods, the subject of the appended claims is not necessarily limited to the specific features or methods described. Rather, the specific features and methods are disclosed as example implementations of techniques for implementing tag based flash intensity determination for image capture. Further, various different embodiments are described, and it is to be appreciated that each described embodiment can be implemented independently or in connection with one or more other described embodiments. Additional aspects of the techniques, features, and/or methods discussed herein relate to one or more of the following.

In some aspects, the techniques described herein relate to a method including: determining a first distance between a first tag and an image capture module; automatically determining, based at least in part on the first distance between the first tag and the image capture module, a flash intensity for the image capture module; and capturing, using the flash intensity, an image.

In some aspects, the techniques described herein relate to a method, further including: determining a physical location of the first tag; determining, based on the physical location of the first tag, whether the first tag is within a field of view of the image capture module; and the automatically determining including automatically determining the flash intensity in response to determining that the first tag is within the field of view of the image capture module.

In some aspects, the techniques described herein relate to a method, wherein the first tag includes an ultra-wideband device.

In some aspects, the techniques described herein relate to a method, further including: determining a second distance between a second tag and the image capture module; combining the first distance and the second distance to create a combined distance; and the automatically determining including automatically determining the flash intensity based at least in part on the combined distance.

In some aspects, the techniques described herein relate to a method, the combining including averaging the first distance and the second distance to create the combined distance.

In some aspects, the techniques described herein relate to a method, further including: determining a second distance between a second tag and the image capture module; determining whether the first tag or the second tag has a highest priority; and the automatically determining including automatically determining, in response to the first tag having the highest priority, the flash intensity based on the first distance between the first tag and the image capture module.

In some aspects, the techniques described herein relate to a method, further including: identifying multiple additional tags; determining, from the first tag and the multiple additional tags, a largest cluster of tags; determining a distance between the largest cluster of tags and the image capture module; and the automatically determining including automatically determining the flash intensity based at least in part on the distance between the largest cluster of tags and the image capture module.

In some aspects, the techniques described herein relate to a method, further including: identifying one or more subjects in a preview frame captured by the image capture module; determining, for each of the one or more subjects, a distance between the subject and the image capture module; combining the first distance and each of the distances between one of the one or more subjects and the image capture module to create a combined distance; and the automatically determining including automatically determining the flash intensity based at least in part on the combined distance.

In some aspects, the techniques described herein relate to a method, further including using face detection to identify each of the one or more subjects.

In some aspects, the techniques described herein relate to a method, the automatically determining comprising automatically determining the flash intensity based at least in part on the first distance between the first tag and the image capture module, an ambient light, and a second distance between the image capture module and a region of interest not associated with a tag.

In some aspects, the techniques described herein relate to a computing device including: an image capture module; a processor implemented in hardware; and a computer-readable storage memory having stored thereon multiple instructions that, responsive to execution by the processor, cause the processor to perform acts including: determining a first distance between a first tag and the image capture module; automatically determining, based at least in part on the first distance between the first tag and the image capture module, a flash intensity for the image capture module; and capturing, using the flash intensity, an image.

In some aspects, the techniques described herein relate to a computing device, the acts further including: determining a physical location of the first tag; determining, based on the physical location of the first tag, whether the first tag is within a field of view of the image capture module; and the automatically determining including automatically determining the flash intensity in response to determining that the first tag is within the field of view of the image capture module.

In some aspects, the techniques described herein relate to a computing device, wherein the first tag includes an ultra-wideband device.

In some aspects, the techniques described herein relate to a computing device, the acts further including: determining a second distance between a second tag and the image capture module; combining the first distance and the second distance to create a combined distance; and the automatically determining including automatically determining the flash intensity based at least in part on the combined distance.

In some aspects, the techniques described herein relate to a computing device, the acts further including: determining a second distance between a second tag and the image capture module; determining whether the first tag or the second tag has a highest priority; and the automatically determining including automatically determining, in response to the first tag having the highest priority, the flash intensity based on the first distance between the first tag and the image capture module, and automatically determining, in response to the second tag having the highest priority, the flash intensity based on the second distance between the second tag and the image capture module.

In some aspects, the techniques described herein relate to a system including: a communication system, implemented at least in part in hardware, to determine a distance of a first tag from an image capture module; a flash intensity determination system, implemented at least in part in hardware, to automatically determine, based at least in part on the first distance between the first tag and the image capture module, a flash intensity for the image capture module; and the image capture module to capture, using the flash intensity, an image.

In some aspects, the techniques described herein relate to a system, wherein: the communication system is further to determine a physical location of the first tag; and the flash intensity determination system is further to determine, based on the physical location of the first tag, whether the first tag is within a field of view of the image capture module, and to automatically determine the flash intensity is to automatically determine the flash intensity in response to determining that the first tag is within the field of view of the image capture module.

In some aspects, the techniques described herein relate to a system, wherein the first tag includes an ultra-wideband device.

In some aspects, the techniques described herein relate to a system, wherein: the communication system is further to identify a second distance between a second tag and the image capture module; and the flash intensity determination system is further to determine whether the first tag or the second tag has a highest priority, to automatically determine the flash intensity is to automatically determine, in response to the first tag having the highest priority, the flash intensity based on the first distance between the first tag and the image capture module, and automatically determine, in response to the second tag having the highest priority, the flash intensity based on the second distance between the second tag and the image capture module.

In some aspects, the techniques described herein relate to a system, wherein: the communication system is further to identify multiple additional tags; and the flash intensity determination system is further to determine, from the first tag and the multiple additional tags, a largest cluster of tags, determine a distance between the largest cluster of tags and the image capture module, and to automatically determine the flash intensity is to automatically determine the flash intensity based at least in part on the distance between the largest cluster of tags and the image capture module.

In some aspects, the techniques described herein relate to a system, wherein: the communication system is further to identify one or more subjects in a preview frame captured by the image capture module; and the flash intensity determination system is further to determine, for each of the one or more subjects, a distance between the subject and the image capture module, combine the first distance and each of the distances between one of the one or more subjects and the image capture module to create a combined distance, and to automatically determine the flash intensity is to including automatically determine the flash intensity based at least in part on the combined distance.

What is claimed is:

1. A method comprising:
   identifying multiple tags within a field of view of an image capture module;
   determining a largest cluster of tags from the multiple tags;
   determining a distance between the largest cluster of tags and the image capture module;
   automatically determining a flash intensity for the image capture module based at least in part on the distance between the largest cluster of tags and the image capture module; and
   capturing, using the flash intensity, an image.

2. The method of claim 1, further comprising:
   determining a physical location of a first tag of the largest cluster of tags; and
   the automatically determining comprising automatically determining the flash intensity based on the physical location of the first tag.

3. The method of claim 2, wherein the first tag comprises an ultra-wideband device.

4. The method of claim 2, further comprising:
   determining a second distance between a second tag and the image capture module;
   combining the distance and the second distance to create a combined distance; and
   the automatically determining comprising automatically determining the flash intensity based at least in part on the combined distance.

5. The method of claim 4, the combining comprising averaging the distance and the second distance to create the combined distance.

6. The method of claim 2, further comprising:
   determining a second distance between a second tag and the image capture module;
   determining whether the first tag or the second tag has a highest priority; and
   the automatically determining comprising automatically determining, in response to the first tag having the highest priority, the flash intensity based on the distance between the first tag and the image capture module.

7. The method of claim 1, further comprising:
   identifying one or more subjects in a preview frame captured by the image capture module;
   determining, for each of the one or more subjects, a distance between a subject and the image capture module;
   combining the distance and distances between one of the one or more subjects and the image capture module to create a combined distance; and
   the automatically determining comprising automatically determining the flash intensity based at least in part on the combined distance.

8. The method of claim 7, further comprising using face detection to identify each of the one or more subjects.

9. The method of claim 1, the automatically determining comprising automatically determining the flash intensity based at least in part on a first distance between a first tag of the largest cluster of tags and the image capture module and a second distance between the image capture module and a region of interest not associated with a tag.

10. The method of claim 1, further comprising identifying a region of interest within a field of view of the image capture module and identifying the multiple tags located in the region of interest.

11. The method of claim 10, wherein the automatically determining the flash intensity for the image capture module is based in part on an ambient light level in the region of interest.

12. A computing device comprising:
    an image capture module;
    a processor implemented in hardware; and
    a computer-readable storage memory having stored thereon multiple instructions that, responsive to execution by the processor, the processor causes the computing device to:
      identify multiple tags within a field of view of the image capture module;
      determine a largest cluster of tags from the multiple tags;
      determine a distance between the largest cluster of tags and the image capture module;
      automatically determine a flash intensity for the image capture module based at least in part on the distance between the largest cluster of tags and the image capture module; and
      capture, using the flash intensity, an image.

13. The computing device of claim 12, wherein the processor causes the computing device to:
    determine a physical location of a first tag of the largest cluster of tags; and
    the automatically determine comprising to determine the flash intensity based on the physical location of the first tag.

14. The computing device of claim 13, wherein the first tag comprises an ultra-wideband device.

15. The computing device of claim 13, wherein the processor causes the computing device to:
    determine a second distance between a second tag and the image capture module;
    combine the distance and the second distance to create a combined distance; and
    the automatically determine comprising to determine the flash intensity based at least in part on the combined distance.

16. The computing device of claim 12, wherein the processor causes the computing device to:
    identify a region of interest within the field of view of the image capture module;

identify the multiple tags located in the region of interest; and determine the flash intensity for the image capture module based at least in part on an ambient light level in the region of interest.

17. A system comprising:

a communication system, implemented at least in part in hardware, to:
 identify multiple tags within a field of view of an image capture module;
 determine a largest cluster of tags from the multiple tags; and
 determine a distance between the largest cluster of tags and the image capture module;

a flash intensity determination system, implemented at least in part in the hardware, to automatically determine a flash intensity for the image capture module based at least in part on the distance between the largest cluster of tags and the image capture module; and the image capture module to capture, using the flash intensity, an image.

18. The system of claim 17, wherein:

the communication system is further configured to determine a physical location of a first tag of the largest cluster of tags; and the flash intensity determination system is further configured to determine, based on the physical location of the first tag, the flash intensity.

19. The system of claim 18, wherein:

the communication system is further configured to identify a second distance between a second tag and the image capture module; and the flash intensity determination system is further configured to determine whether the first tag or the second tag has a highest priority, to automatically determine the flash intensity is to automatically determine, in response to the first tag having the highest priority, the flash intensity based on the distance between the first tag and the image capture module, and automatically determine, in response to the second tag having the highest priority, the flash intensity based on the second distance between the second tag and the image capture module.

20. The system of claim 17, wherein:

the communication system is further configured to identify one or more subjects in a preview frame captured by the image capture module; and the flash intensity determination system is further configured to determine, for each of the one or more subjects, a distance between a subject and the image capture module, combine the first distance and distances between one of the one or more subjects and the image capture module to create a combined distance, and to automatically determine the flash intensity is to comprising automatically determine the flash intensity based at least in part on the combined distance.

\* \* \* \* \*